(12) United States Patent
Szasz

(10) Patent No.: US 12,128,981 B2
(45) Date of Patent: Oct. 29, 2024

(54) BICYCLE MOUNTED STORAGE DEVICE

(71) Applicant: Lorinc Szasz, La Mirada, CA (US)

(72) Inventor: Lorinc Szasz, La Mirada, CA (US)

( * ) Notice: Subject to any disclaimer, the term of this patent is extended or adjusted under 35 U.S.C. 154(b) by 521 days.

(21) Appl. No.: 17/507,267

(22) Filed: Oct. 21, 2021

(65) Prior Publication Data

US 2023/0128250 A1 Apr. 27, 2023

(51) Int. Cl.
*B62J 9/22* (2020.01)
*B62J 9/27* (2020.01)
*B62J 45/10* (2020.01)

(52) U.S. Cl.
CPC . *B62J 9/22* (2020.02); *B62J 9/27* (2020.02); *B62J 45/10* (2020.02)

(58) Field of Classification Search
CPC .................. B62J 9/22; B62J 45/10; B62J 9/27
See application file for complete search history.

(56) References Cited

U.S. PATENT DOCUMENTS

| | | | | |
|---|---|---|---|---|
| 2,051,823 A * | 8/1936 | Clarke | ....................... | B62J 9/22 224/418 |
| 3,741,429 A * | 6/1973 | Purcell, Jr. | ............... | B62J 11/04 220/480 |
| 4,469,256 A | 9/1984 | McEwen | | |
| 4,981,243 A | 1/1991 | Rogowski | | |
| 5,222,752 A * | 6/1993 | Hewitt | ....................... | B62J 43/30 280/288.4 |
| 5,862,965 A * | 1/1999 | Nakahara | ................... | B62J 9/22 224/419 |
| D493,409 S | 7/2004 | Krejci | | |
| 7,819,413 B2 * | 10/2010 | White | .................... | B62K 19/40 280/281.1 |
| 9,567,772 B1 * | 2/2017 | Snell | ....................... | B62H 5/003 |
| 10,427,742 B2 | 10/2019 | Osada | | |
| 2005/0000990 A1 * | 1/2005 | Gilstrap | ..................... | B62J 9/22 224/42.2 |
| 2010/0072238 A1 | 3/2010 | Pape | | |
| 2013/0214019 A1 * | 8/2013 | Wu | ......................... | B62J 50/225 224/412 |
| 2017/0074023 A1 * | 3/2017 | Peck | ........................ | E05G 1/005 |
| 2018/0050752 A1 * | 2/2018 | Wang | ...................... | B62K 21/12 |
| 2021/0347429 A1 * | 11/2021 | Zappa | ......................... | B62J 9/23 |

FOREIGN PATENT DOCUMENTS

WO WO2015022554 2/2015

\* cited by examiner

*Primary Examiner* — Jacob D Knutson

(57) ABSTRACT

A bicycle mountable storage device for stowing articles and broadcasting audio includes a container, which comprises a top piece that is hingedly engaged to a bottom piece. The bottom piece is mountable to a frame of a bicycle. A battery and a receiver are positioned in an interior space defined by the container. A speaker is engaged to the container and is operationally engaged to the battery. The receiver is operationally engaged to the battery and communicatively engaged to the speaker. The receiver receives an audio signal from an electronic device of a user and the speaker broadcasts the audio signal.

17 Claims, 5 Drawing Sheets

BICYCLE MOUNTED STORAGE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to storage devices and more particularly pertains to a new storage device for stowing articles and broadcasting audio. The present invention discloses a bicycle mountable storage device comprising a foam lined, teardrop shaped, clamshell container, which can be mounted to a frame of a bicycle for stowing personal items while mimicking a gas tank of a motorcycle. A battery, receiver, and a speaker allow a user to broadcast audio from an electronic device.

(2) Description of Related Art Including Information Disclosed Under 37 CFR 1.97 and 1.98

The prior art relates to storage devices. Such prior art storage devices for bicycles include handlebar mountable housings for electronic devices, and soft, narrow containers mountable to top tubes of bikes. What is lacking in the prior art is a bicycle mountable storage device comprising a foam lined, teardrop shaped, clamshell container, which can be mounted to a frame of a bicycle for stowing personal items while mimicking a gas tank of a motorcycle. A battery, receiver, and a speaker allow a user to broadcast audio from an electronic device.

BRIEF SUMMARY OF THE INVENTION

An embodiment of the disclosure meets the needs presented above by generally comprising a container, which comprises a top piece that is hingedly engaged to a bottom piece. The bottom piece is configured to be mounted to a frame of a bicycle. A battery and a receiver are positioned in an interior space defined by the container. A speaker is engaged to the container and is operationally engaged to the battery. The receiver is operationally engaged to the battery and communicatively engaged to the speaker. The receiver is configured to receive an audio signal from an electronic device of a user so that the audio signal is broadcast by the speaker.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
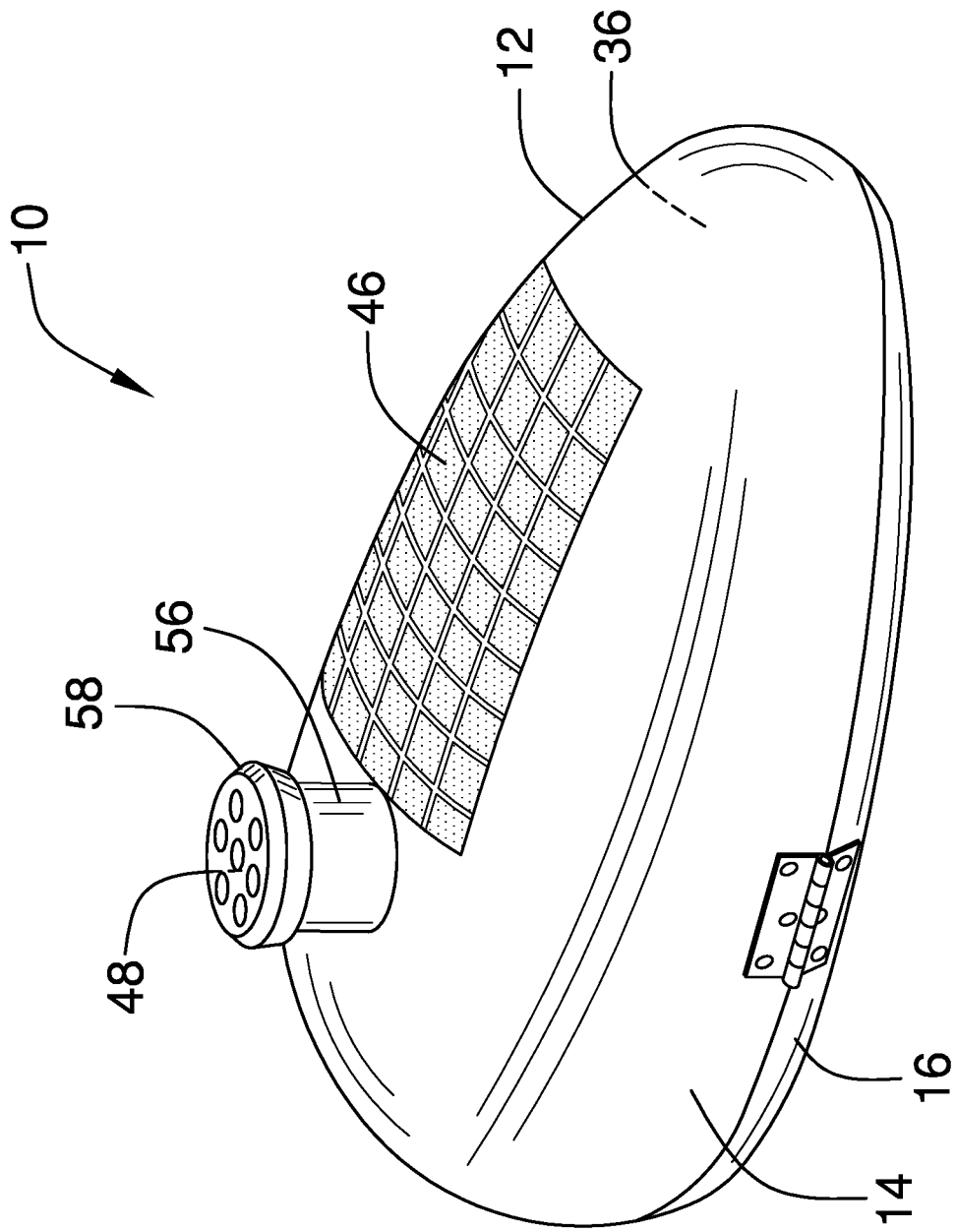
FIG. 1 is an isometric perspective view of a bicycle mountable storage device according to an embodiment of the disclosure.
Figure 2:
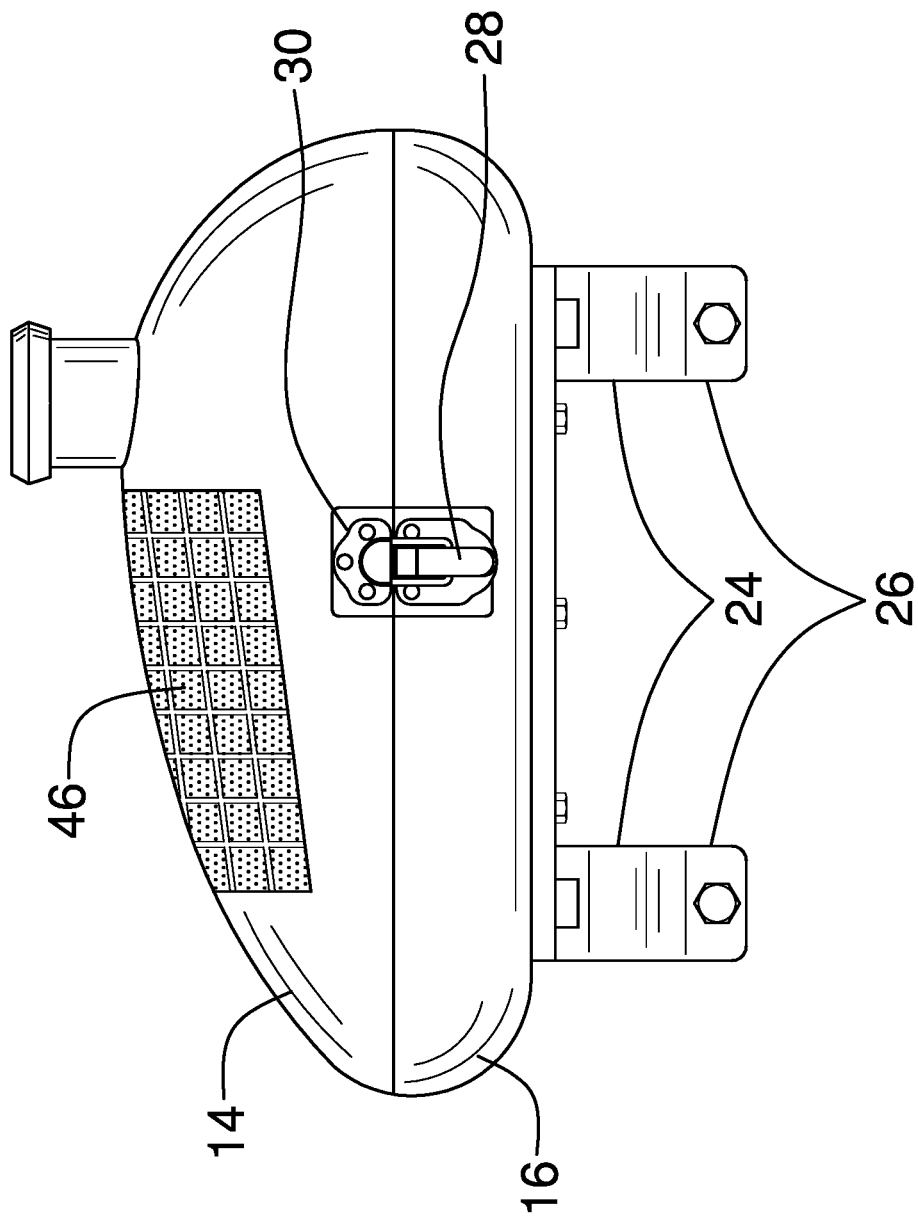
FIG. 2 is a side view of an embodiment of the disclosure.
Figure 4:
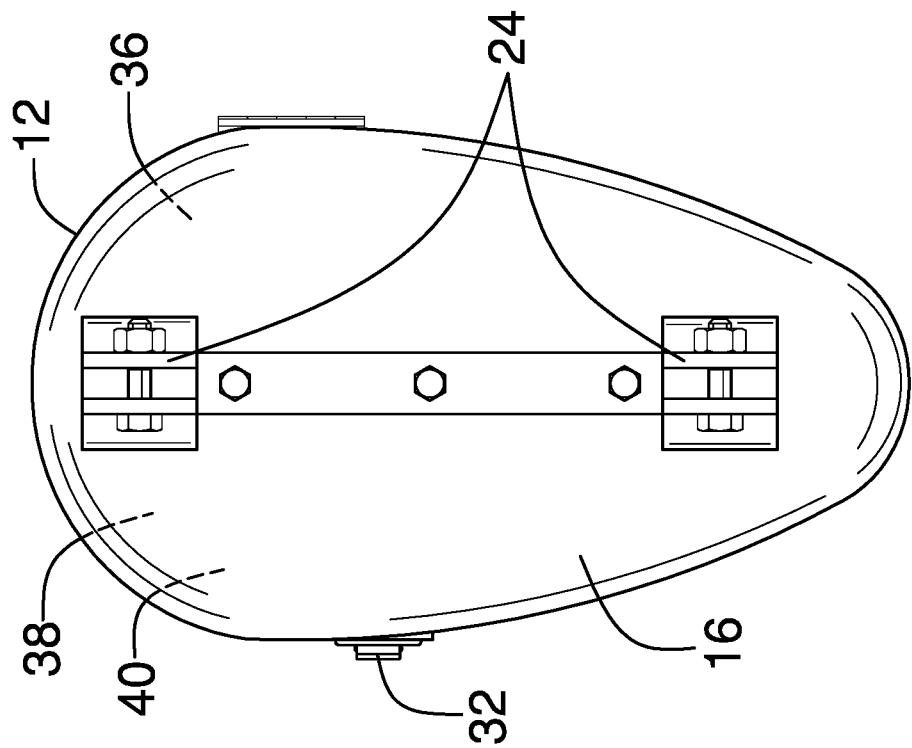
FIG. 4 is a bottom view of an embodiment of the disclosure.

With reference now to the drawings, and in particular to FIGS. 1 through 6 thereof, a new storage device embodying the principles and concepts of an embodiment of the disclosure and generally designated by the reference numeral 10 will be described.

As best illustrated in FIGS. 1 through 6, the bicycle mountable storage device 10 generally comprises a container 12, which in turn comprises a top piece 14 that is hingedly engaged to a bottom piece 16. The bottom piece 16 is configured to be mounted to a frame 18 of a bicycle 20. The container 12 may be substantially teardrop shaped and thus configured to mimic a gas tank of a motorcycle upon mounting to a top tube 22 of the frame 18 of the bicycle 20. The present invention anticipates the container 12 being alternatively shaped, as motorcycle gas tanks have a variety of shapes. The container 12 may comprise metal, plastic, carbon fiber, fiberglass, or the like.

Figure 3:
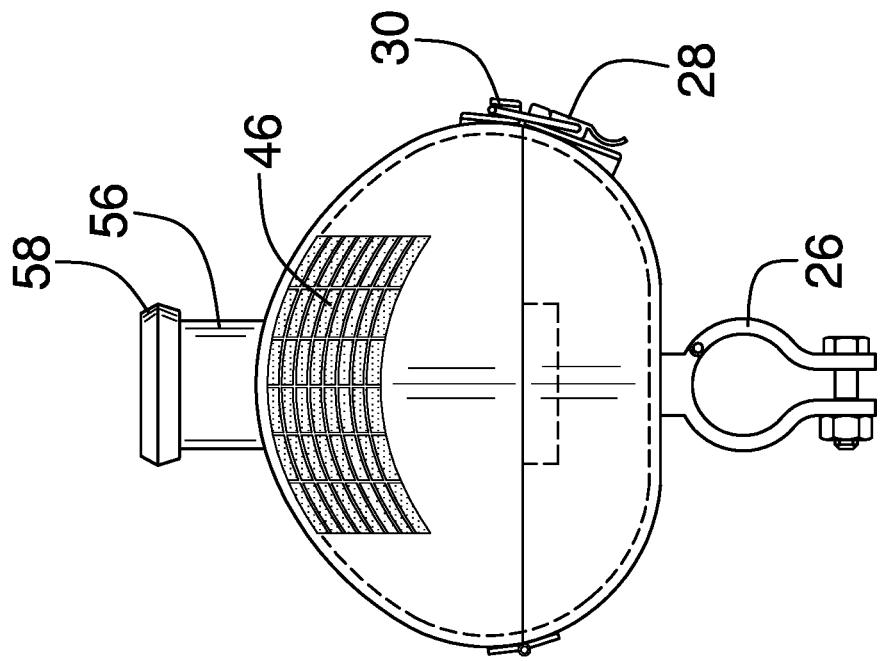
FIG. 3 is an end view of an embodiment of the disclosure.
Figure 6:
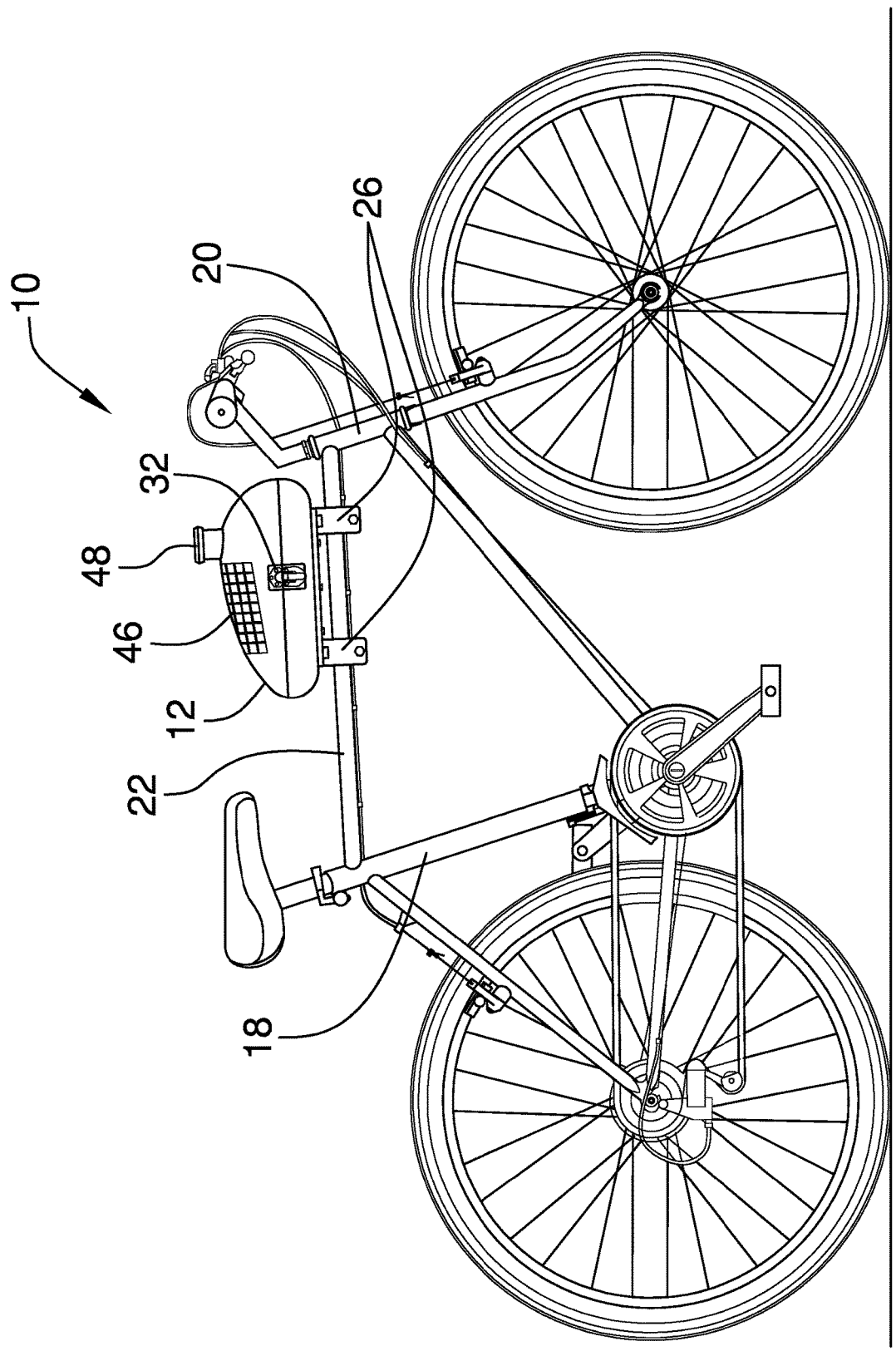
FIG. 6 is an in-use view of an embodiment of the disclosure.

A coupler 24 is engaged to the bottom piece 16, as shown in FIG. 3. The coupler 24 is configured to selectively engage the top tube 22 of the frame 18 so that the container 12 is removably mounted to the top tube 22, as shown in FIG. 6. The coupler 24 may comprise a pair of clamps 26, or other coupling means, such as, but not limited to, brackets, straps, and the like.

A first fastener 28 is engaged to the bottom piece 16. A second fastener 30 is engaged to the top piece 14. The second fastener 30 is complementary to the first fastener 28 and thus is positioned to selectively engage the first fastener 28 to fasten the top piece 14 to the bottom piece 16. The second fastener 30 and the first fastener 28 may comprise a clasp 32, or other fastening means, such as, but not limited to, snap closures, zippers, and the like. The present invention also anticipates the clasp 32 being lockable.

Figure 5:
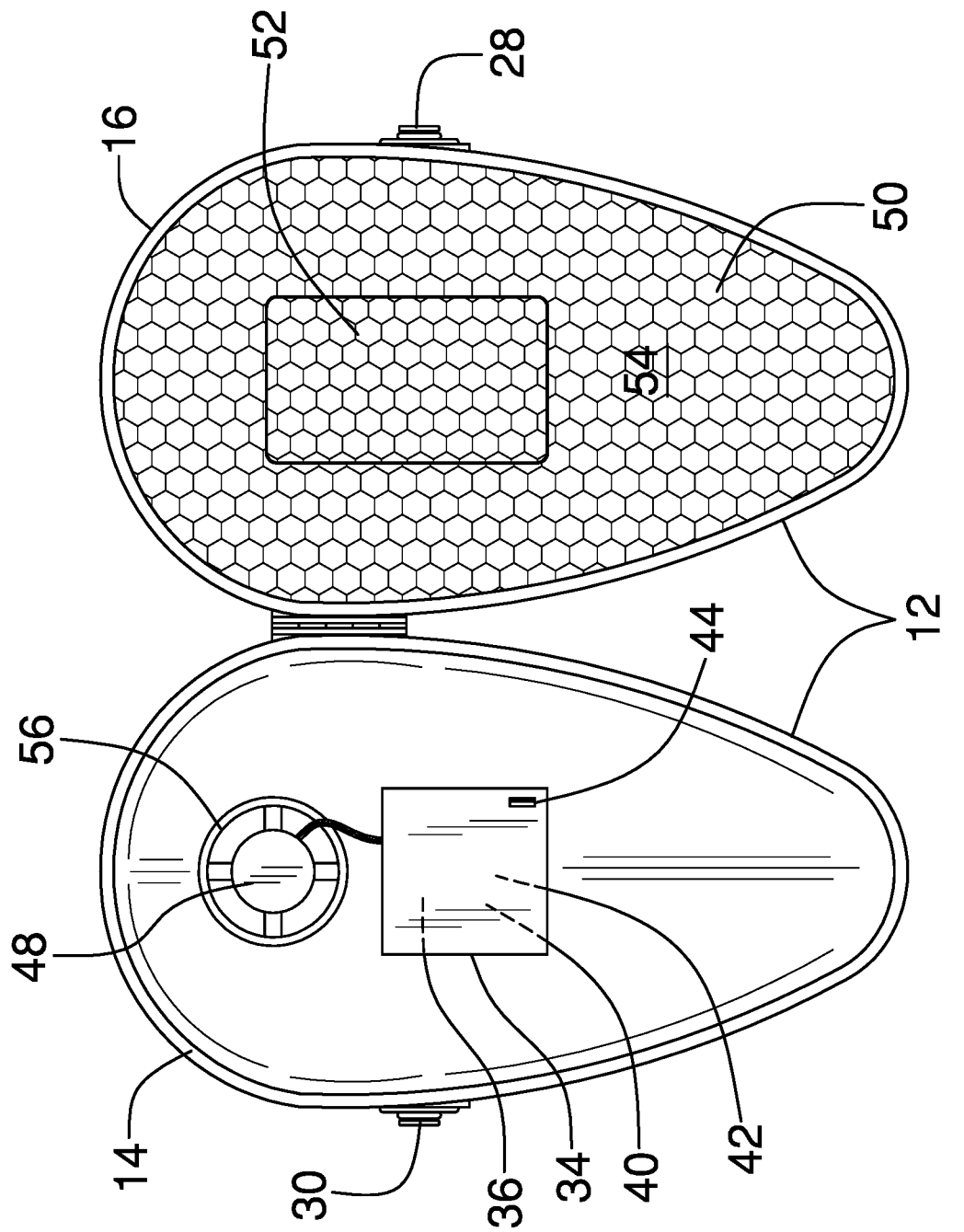
FIG. 5 is a top view of an embodiment of the disclosure.

A housing 34 is engaged to the container 12 and is positioned in an interior space 36 defined by the container 12. The housing 34 may be engaged to the top piece 14, as shown in FIG. 5. A battery 38 and a receiver 40 are engaged to the housing 34 and are positioned in an internal space 42 defined by the housing 34. The receiver 40 is operationally engaged to the battery 38, which is rechargeable. A port 44 is engaged to the housing 34 and is operationally engaged to the battery 38. The port 44 is configured to selectively engage a plug of a charging cord (not shown) to operationally engage the battery 38 to a source of electrical current to charge the battery 38.

The bicycle mountable storage device 10 also may comprise a solar panel 46, which is engaged to the top piece 14 and which is operationally engaged to the battery 38. The solar panel 46 is configured to convert solar radiation to an electrical current to charge the battery 38.

A speaker 48 is engaged to the container 12 and is operationally engaged to the battery 38. The receiver 40 is communicatively engaged to the speaker 48. The receiver 40 is configured to receive an audio signal from an electronic device of a user so that the audio signal is broadcast by the speaker 48.

A pad 50 is engaged to the bottom piece 16 of the container 12 and is positioned in the interior space 36. The pad 50 is configured to cushion an article that is stowed in the container 12. The pad 50 comprises foamed elastomer, rubber, silicone, fabric, or the like. A recess 52 is positioned in an upper surface 54 of the pad 50. The recess 52 is shaped complementary to a cellphone and thus is configured for insertion of the cellphone to frictionally engage the cellphone to the pad 50.

As shown in FIG. 3, a pipe 56 is engaged to and extends from the top piece 14 of the container 12. A cap 58 is engaged to the pipe 56 distal from the container 12. The speaker 48 is engaged to and positioned in the cap 58. The cap 58 and the pipe 56 are configured to mimic a fuel inlet of a gas tank.

In use, the bottom piece 16 of the container 12 is mounted to a top tube 22 of a frame 18 of a bicycle 20 using the clamps 26. The container 12, being substantially teardrop shaped, mimics a gas tank of a motorcycle. The container 12 can be used to stow articles, such as cellphones, keys, wallets, water bottles, water bladders, and the like. A user can pair their electronic device, such as a cellphone, with the receiver 40 to broadcast an audio signal via the speaker 48.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bicycle mountable storage device comprising:
   a container comprising a top piece hingedly engaged to a bottom piece, the bottom piece being configured for mounting to a frame of a bicycle;
   a battery positioned in an interior space defined by the container, the battery being rechargeable;
   a speaker engaged to the container, the speaker being operationally engaged to the battery;
   a receiver positioned in the interior space, the receiver being operationally engaged to the battery and communicatively engaged to the speaker, wherein the receiver is configured for receiving an audio signal from an electronic device of a user, such that the audio signal is broadcast by the speaker;
   a housing engaged to the container and positioned in the interior space, the housing defining an internal space, the battery and the receiver being engaged to the housing and positioned in the internal space; and
   a port engaged to the housing and operationally engaged to the battery, the port being configured for selectively engaging a plug of a charging cord for operationally engaging the battery to a source of electrical current for charging the battery.

2. The bicycle mountable storage device of claim 1, wherein the container is
   substantially teardrop shaped, wherein the container is configured for mimicking a gas tank of a motorcycle upon mounting to a top tube of the frame of the bicycle.

3. The bicycle mountable storage device of claim 2, further including:
   a pipe engaged to and extending from the top piece of the container; and
   a cap engaged to the pipe distal from the container, the speaker engaged to and positioned in the cap, wherein the cap and the pipe are configured for mimicking a fuel inlet of a gas tank.

4. The bicycle mountable storage device of claim 1, further including a coupler engaged to the bottom piece and being configured for selectively engaging a top tube of the frame, such that the container is removably mounted to the top tube.

5. The bicycle mountable storage device of claim 4, wherein the coupler comprises a pair of clamps.

6. The bicycle mountable storage device of claim 1, further including:
   a first fastener engaged to the bottom piece; and
   a second fastener engaged to the top piece, the second fastener being complementary to the first fastener, such that the second fastener is positioned for selectively engaging the first fastener for fastening the top piece to the bottom piece.

7. The bicycle mountable storage device of claim 6, wherein the second fastener and the first fastener comprise a clasp.

8. The bicycle mountable storage device of claim 1, further including a solar panel engaged to the top piece and being operationally engaged to the battery, wherein the solar panel is configured for converting solar radiation to an electrical current for charging the battery.

9. The bicycle mountable storage device of claim 1, further including a pad engaged to the bottom piece of the container and being positioned in the interior space, wherein the pad is configured for cushioning an article positioning in the container.

10. The bicycle mountable storage device of claim 9, wherein the pad comprises foamed elastomer.

11. The bicycle mountable storage device of claim 9, further including a recess positioned in an upper surface of the pad, the recess being shaped complementary to the electronic device, wherein the recess is configured for insertion of the electronic device for frictionally engaging the electronic device to the pad.

12. A bicycle storage system comprising:
a bicycle comprising a frame;
a container comprising a top piece hingedly engaged to a bottom piece, the bottom piece being mount to a top tube of the frame, the container being substantially teardrop shaped, wherein the container is configured for mimicking a gas tank of a motorcycle;
a pipe engaged to and extending from the top piece of the container; and
a cap engaged to the pipe distal from the container, wherein the cap and the pipe are configured for mimicking a fuel inlet of the gas tank;
a battery positioned in an interior space defined by the container;
a speaker engaged to and positioned in the cap, the speaker being operationally engaged to the battery; and
a receiver positioned in the interior space, the receiver being operationally engaged to the battery and communicatively engaged to the speaker, wherein the receiver is configured for receiving an audio signal from an electronic device of a user, such that the audio signal is broadcast by the speaker.

13. The bicycle storage system of claim 12, further including:
a first fastener engaged to the bottom piece; and
a second fastener engaged to the top piece, the second fastener being complementary to the first fastener, such that the second fastener is positioned for selectively engaging the first fastener for fastening the top piece to the bottom piece.

14. The bicycle storage system of claim 12, further including:
the battery being rechargeable;
a housing engaged to the container and positioned in the interior space, the housing defining an internal space, the battery and the receiver being engaged to the housing and positioned in the internal space; and
a port engaged to the housing and operationally engaged to the battery, the port being configured for selectively engaging a plug of a charging cord for operationally engaging the battery to a source of electrical current for charging the battery.

15. The bicycle storage system of claim 12, further including a solar panel engaged to the top piece and being operationally engaged to the battery, wherein the solar panel is configured for converting solar radiation to an electrical current for charging the battery.

16. The bicycle storage system of claim 12, further including:
a pad engaged to the bottom piece of the container and being positioned in the interior space, wherein the pad is configured for cushioning an article positioning in the container; and
a recess positioned in an upper surface of the pad, the recess being shaped complementary to the electronic device, wherein the recess is configured for insertion of the electronic device for frictionally engaging the electronic device to the pad.

17. A bicycle mountable storage device comprising:
a container comprising a top piece hingedly engaged to a bottom piece, the bottom piece being configured for mounting to a frame of a bicycle, the container being substantially teardrop shaped, wherein the container is configured for mimicking a gas tank of a motorcycle upon mounting to a top tube of the frame of the bicycle;
a coupler engaged to the bottom piece and being configured for selectively engaging the top tube of the frame, such that the container is removably mounted to the top tube, the coupler comprising a pair of clamps;
a first fastener engaged to the bottom piece;
a second fastener engaged to the top piece, the second fastener being complementary to the first fastener, such that the second fastener is positioned for selectively engaging the first fastener for fastening the top piece to the bottom piece, the second fastener and the first fastener comprising a clasp;
a battery positioned in an interior space defined by the container, the battery being rechargeable;
a housing engaged to the container and positioned in the interior space, the housing defining an internal space, the battery and the receiver being engaged to the housing and positioned in the internal space;
a port engaged to the housing and operationally engaged to the battery, the port being configured for selectively engaging a plug of a charging cord for operationally engaging the battery to a source of electrical current for charging the battery;
a solar panel engaged to the top piece and being operationally engaged to the battery, wherein the solar panel is configured for converting solar radiation to an electrical current for charging the battery;
a speaker engaged to the container, the speaker being operationally engaged to the battery;
a receiver positioned in the interior space, the receiver being operationally engaged to the battery and communicatively engaged to the speaker, wherein the receiver is configured for receiving an audio signal from an electronic device of a user, such that the audio signal is broadcast by the speaker;
a pad engaged to the bottom piece of the container and being positioned in the interior space, wherein the pad is configured for cushioning an article positioning in the container, the pad comprising foamed elastomer;
a recess positioned in an upper surface of the pad, the recess being shaped complementary to the electronic device, wherein the recess is configured for insertion of the electronic device for frictionally engaging the electronic device to the pad;
a pipe engaged to and extending from the top piece of the container; and
a cap engaged to the pipe distal from the container, the speaker engaged to and positioned in the cap, wherein the cap and the pipe are configured for mimicking a fuel inlet of the gas tank.

* * * * *